United States Patent [19]

Lowrey et al.

[11] 4,128,685
[45] Dec. 5, 1978

[54] SKIVABLE BILLET AND PRODUCTS

[75] Inventors: Robert D. Lowrey, North Oaks; Arthur A. Wegwerth, Maplewood; Donna M. Koeck, Saint Paul; Sanford Cobb, Jr., Saint Mary's Point, all of Minn.

[73] Assignee: Minnesota Mining and Manufacturing Company, Saint Paul, Minn.

[21] Appl. No.: 747,506

[22] Filed: Dec. 6, 1976

[51] Int. Cl.² .................... B32B 9/00; B32B 23/08; B32B 27/30

[52] U.S. Cl. .................... 428/212; 260/29.6 MN; 350/1.6; 428/331; 428/332; 428/339; 428/510; 428/522

[58] Field of Search ................ 260/42.21, 29.6 MN; 83/15; 156/225; 8/DIG. 18 A; 264/1, 158, 77, 160; 428/114, 212, 331, 404, 522, 542, 65, 339, 510, 332; 350/1.6

[56] References Cited

U.S. PATENT DOCUMENTS

| Re. 27,617 | 4/1973 | Olsen | 428/65 X |
| 2,822,271 | 2/1958 | Krieger | 96/91 R |
| 3,190,850 | 6/1965 | Burke | 260/42.21 X |
| 3,499,820 | 3/1970 | Desaulmers | 428/331 X |
| 3,585,094 | 6/1971 | Ruggles | 428/331 X |
| 3,839,253 | 10/1974 | Kershaw et al. | 428/331 X |

*Primary Examiner*—George F. Lesmes
*Assistant Examiner*—R. Eugene Varndell, Jr.
*Attorney, Agent, or Firm*—Cruzan Alexander; Donald M. Sell; Temple Clayton

[57] ABSTRACT

A skivable billet having improved uniform heat absorptive ability in which layers of enhanced optical density comprise water soluble polyazo direct dyes such as Formanil Black G and finely divided silica.

3 Claims, 1 Drawing Figure

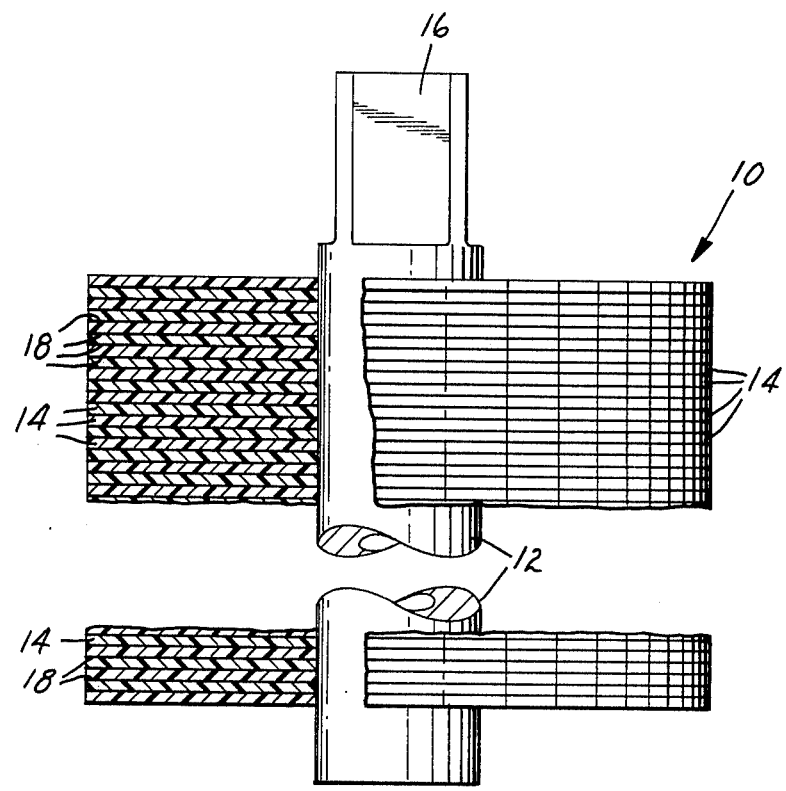

SKIVABLE BILLET AND PRODUCTS

This invention relates to improvements in the skiving of louvered films and particularly to improvements which facilitate skiving to thicknesses as low as about 0.1 mm.

The process for skiving louvered films is described by Olsen, U.S. Pat. No. RE. 27,617 where the heating of the surface to be skived is described and illustrated. Other references describe the preparation of floor tile, e.g., U.S. Pat. No. 3,198,860 and decorative materials, e.g., Belgium Pat. No. 559,159, by skiving procedures.

Certain problems are encountered in fabricating louvered materials in sheets as thin as about 0.1 mm., particularly when using polymeric materials which require substantial softening to permit skiving to be effected. It is found that the heating although applied over the entire surface may tend to be absorbed preferentially by the opaque louver material so that the billet employed is softer along the louver lines than along the clear or transparent lines. When sheets as thin as 0.5 mm and particularly about 0.2 mm and even more for thinner sheets, are to be produced, the temperature differentials in the sheet result in mechanical weaknesses which make skiving difficult. It will be recognized that the construction of billets is a relatively costly and time consuming operation and accordingly it is desirable to obtain as many lineal feet of sheet material as possible from a billet. This is accomplished by minimizing the thickness of the sheet material as much as possible without exceeding or eliminating the desired optical effects. In practice a sheet 0.2 mm thick or less provides useful properties at an economy of material of 20% or more over material 0.25 mm thick and even more over thicker material. Louvered sheet material 0.2 mm thick with louvers from 0.06 mm up to one half the thickness of the sheet material provides useful optical aperture and shielding effects which serve to eliminate sidelighting and other undesirable effects at the sides. Sheets as thin as about 0.1 to 0.25 mm are exceedingly difficult to skive by heretofore known procedures particularly using cellulose acetate butyrate resin having pigmented louvers.

It is an aim or object of this invention to provide billets of alternating layers of plastic having relatively low and relatively high optical densities but relatively uniform heat absorptive ability which billets can be readily skived to thicknesses of about 0.1 mm. Other aims and objects will become evident herein elsewhere.

In accordance with these and other aims and objects of the invention it has been found that billets which can be readily skived to thicknesses of as low as 0.1 mm and up to about 1 mm are obtained by employing a particular group of soluble coloring agents together with anti-blocking particles and acrylic latices for providing layers of higher optical density which are coated on sheets of clear or low optical density plastic. Disks for constructions of billets are formed and billet formation is carried out, for example, as described in U.S. Pat. RE. No. 27,617. A billet 10 of the invention is shown in the drawing herewith having shaft 12 formed from disks 14 having opaque layers 18 as described herein represented by the thickened lines separating disks. The shaft is shown with one end 16 squared to permit grasping by the chuck of a lathe (not shown).

The particular group of soluble coloring agents are the polyazo direct dyes such as Direct Black 22 (i.e., Formanil Black G; color index 35435), Direct Black 100 (color index 35415), Acid Black 4 (color index 35420), Cotoseral V extra (color index 35430), Direct Blue 70 (color index 34205), Direct Red 103 (color index 34025), Direct Green 26 (color index 34045).

The anti-blocking particles which are included are particularly finely divided silica, e.g., diatomaceous earth such as Cellite available from Johns Manville. Other finely divided materials can be used which will prevent blocking, i.e., premature adhesion of successive sheets under normal storage conditions.

The preferred clear plastic material is cellulose acetate butyrate which it is found is advantageously coated with composite self cross-linking anionic acrylates in latex form such as combinations of latices available under the tradename Rhoplex from Rohm and Haas Co. The composite acrylates are desirably provided with a small amount of defoaming agent, e.g., octanol, and then after removal of water are very effective for adhering the several layers in the billet.

In combination with the latices and anti-blocking material desired optical densities are conveniently attained without materially altering absorptivity of infra-red radiation or heat by use of a water soluble polyazo direct dye. Formanil Black G, particularly that available in unpurified form from American Color Chemical Co. is particularly useful for this purpose because it does not settle out from the latices, can be varied over considerable ranges of concentration and is relatively stable to light.

As an example of preparing a coating of enhanced optical density (about 3.0), 275 grams water, 1378 grams Formanil Black G (unpurified; purified Formanil Black G is found to be generally unsatisfactory) and 278 grams Cellite (finely divided silica) in a 54 l. container for 24 hours using 12 to 13 mm steel balls. To the resulting black slurry are added 6.3 kg Rhoplex N495 (semi-reactive anionic acrylate emulsion with torsional modulus 300 kg/cm$^2$ at $-3°$ C.), 3.15 kg Rhoplex TR 407 (reactive, i.e., self-crosslinking anionic acrylate emulsion with torsional modulus 300 kg/cm$^2$ at $+30°$ C.) 9.0 kg Rhoplex E 269 (reactive anionic acrylate emulsion with torsional modulus 300 kg/cm$^2$ at $+7°$ C.) and 0.5 kg octanol. Ball-milling is contained for a further 4 hours and the resulting coating composition is ready for use for coating operations.

A continuous web of cellulose acetate butyrate, 0.08 mm thick is coated using a knife-coater with 0.01 mm thick layer of the above coating composition which is dried. The laminate is die-cut to give similar rings and a billet constructed as described in U.S. Pat. RE. No. 27,617. After consolidation and cooling the billet is readily skived to a thickness of about 0.15 mm and gives useful light control film. Similar light control films are made by substituting other polyazo direct dyes and skiving to thicknesses of from about 0.1 to about 1.0 mm.

What is claimed is:

1. A skivable billet of alternating layers of low and relatively high optical density, said layers being relatively similar in absorptive properties toward infrared radiation, said layers of low optical density being essentially cellulose acetate butyrate and said layers of relatively higher optical density being a composition comprised of composite self-cross-linking anionic acrylates, finely divided silica and water soluble polyazo direct dye.

2. A skivable billet according to claim 1 wherein the water soluble polyazo direct dye is Formanil Black G.

3. A skived film about 0.15 to 0.25 mm thick formed by skiving a billet according to claim 1 with surface heating.

* * * * *